UNITED STATES PATENT OFFICE.

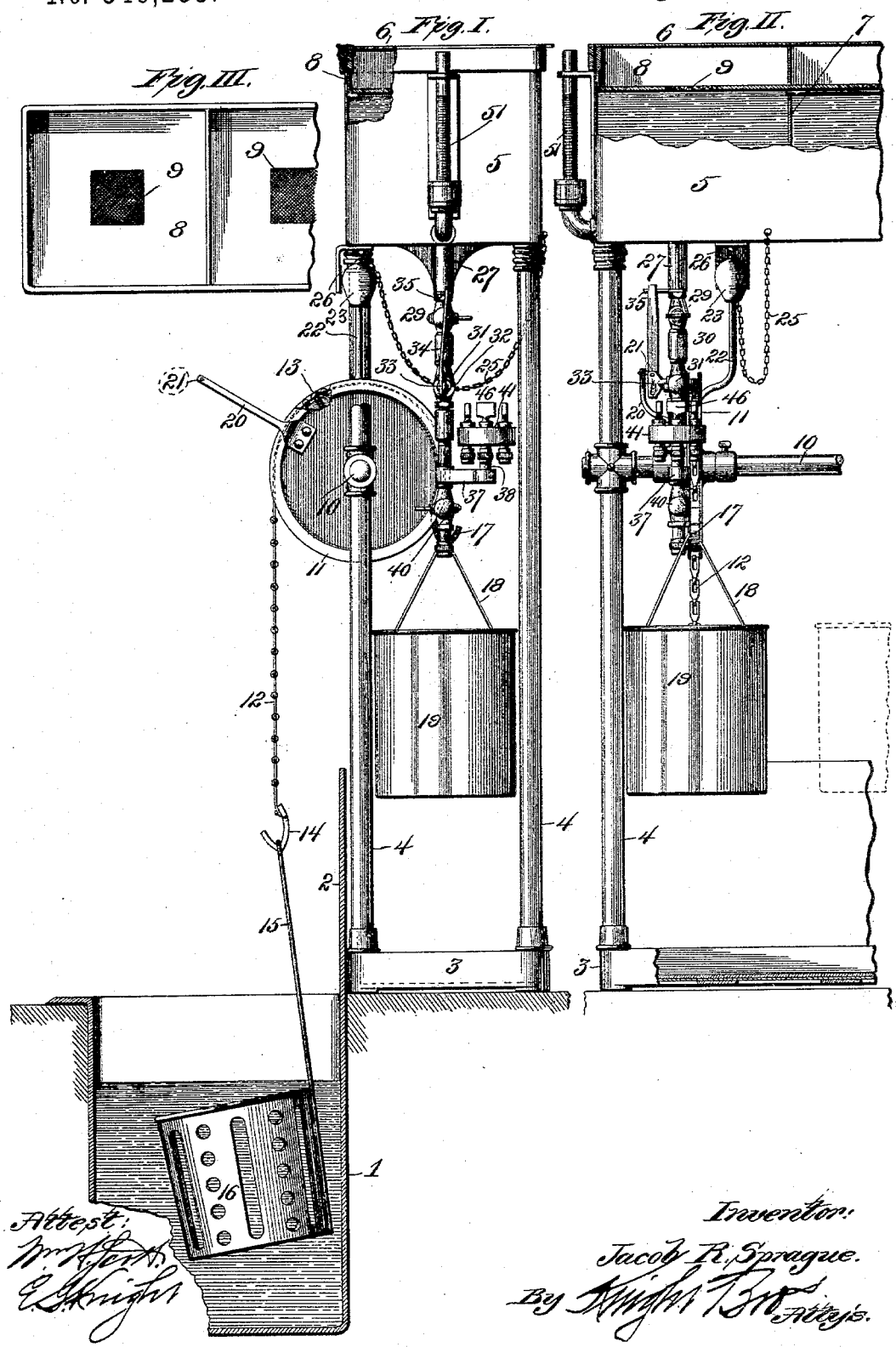

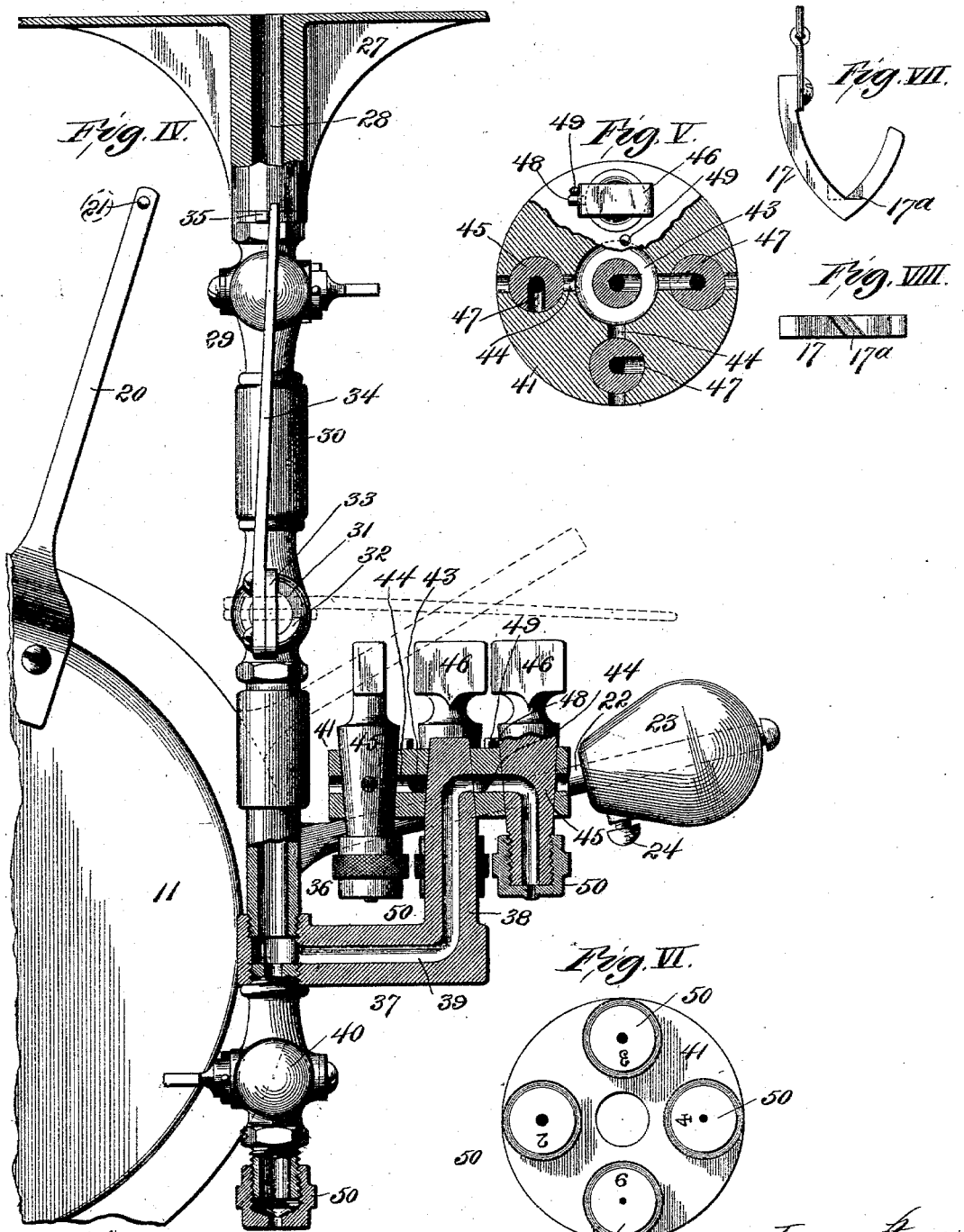

JACOB R. SPRAGUE, OF ST. LOUIS, MISSOURI.

AUTOMATIC EGG-BOILING APPARATUS.

SPECIFICATION forming part of Letters Patent No. 546,255, dated September 10, 1895.

Application filed June 29, 1895. Serial No. 554,405. (No model.)

*To all whom it may concern:*

Be it known that I, JACOB R. SPRAGUE, of the city of St. Louis, in the State of Missouri, have invented a certain new and useful Improvement in an Automatic Egg-Boiling Apparatus, of which the following is a full, clear, and exact description, reference being had to the accompanying drawings, forming part of this specification.

My invention relates to an apparatus for employment in boiling eggs in which the requisite timing is accomplished automatically by a discharge of liquid into a pendent vessel, which vessel, on attaining sufficient weight of contents, is caused to gravitate and operate mechanism that withdraws an egg-receptacle from the boiler, thereby arresting the process of cooking, and at the same time shuts off the discharge of water into said vessel.

My invention consists in features of novelty hereinafter fully described, and pointed out in the claims.

Figure I is an end view of the apparatus. Fig. II is a side elevation. Fig. III is a top view of the tank. Fig. IV is an enlarged side elevation and vertical section of the water feed and discharge device. Fig. V is a horizontal section of the multiple valve, one of the valve-keys being shown in top view. Fig. VI is a bottom view of the multiple valve. Fig. VII is a detail side elevation of the water-vessel-supporting hook. Fig. VIII is a top view of said hook.

Referring to the drawings, 1 designates the water-boiler, which is mounted on a suitable support and to which heat may be applied by any ordinary means. This boiler preferably has a vertical extension 2 above its main body, forming a guide for the egg-basket.

3 designates the base of the apparatus, on which are vertical posts 4, that support a water-tank 5. The tank has a lid 6, and it is preferably divided by partitions 7 into a number of compartments corresponding to the number of egg-baskets employed, as there may be from one to any desired number of said baskets.

8 is a compartment strainer-plate set in the tank and provided with openings covered by strainers 9, and between the top of the partitions 7 and the strainer-plate is an opening from each compartment of the tank to the adjoining compartment, thereby permitting the water when it reaches the height of such opening to overflow into the compartment adjoining.

10 designates a shaft extending the length of the apparatus and mounted on the posts 4, and on this shaft are loosely mounted grooved pulleys 11, one to each egg-basket. To this pulley is secured a chain 12, held by suitable means, such as a screw 13. One end of such chain is provided with a hook 14, that receives the bail 15 of the egg-basket 16, provided with openings for the free passage of water through it.

The opposite end of the chain 12 is provided with a hook 17, that receives the bail 18 of a bucket 19, said bail 18 being of inverted-V form for the purpose of causing its center to always rest in the hook in order to sustain the bucket in a level position. The hook 17 is shown in detail in Figs. VII and VIII, and as there shown it has a diagonally-formed groove 17$^a$, that forms the seat of the bail 18, the object being to cause the bail to hang at an angle with relation to the hook for the purpose hereinafter explained.

On one side of the pulley 11 is an arm 20, having at its outer end a projection 21, and at the opposite side of the pulley is an arm 22, that carries a weight 23, arranged to be set in any desired position on said arm and held by a set-screw 24. Attached to the arm 22 is one end of a chain 25, whose opposite end is secured to the tank 5. This chain limits the movement of the arm 22, and consequently the pulley 11, in one direction, and their movement in the opposite direction is limited by a stop 26 on the under side of the tank 5.

Secured to the under side of the tank is a pipe-bracket 27, provided with a central passage-way 28, and connected to said hollow bracket is a cock 29, that in turn is connected by a coupling 30 to a second cock 31. On the globe of the cock 31 is a flange-stop 32, with which the key 33 comes in contact and by which said key is limited in movement. The key 33 carries an arm 34, that in its vertical position comes in contact with a stop 35 on the bracket 27, the use of which arm will be explained in the description of the operation of the apparatus. Beneath the cock 31 is a pipe 36, to which is secured an arm 37, provided with a vertical extension 38, through which arm and extension is a passage-way 39. Secured to the arm 27 immediately beneath the pipe 36 is a cock 40.

41 designates a valve-disk loosely seated on the end of the extension 38 of arm 37, and in the central portion of said disk, around the extension 38, is a channel 43, that communicates with the passage-way 39. Diverging from the channel 43 are ducts 44, that lead to the valve-seats supplied with plugs 45, having keys 46, and through each one of said plugs is a duct 47, arranged to register with the ducts 44. Each plug is provided with a stud 48, arranged to come in contact with either of two studs 49 on the upper surface of the valve-disk for the purpose of limiting the valve in its movement into closed or open position, and through this arrangement the operator always knows to a certainty that the valve is correctly set into either position to which the plug may be turned.

The lower end of each valve-plug 45 is equipped with a nipple 50, and the cock 40 is also equipped with a similar nipple. The openings in these nipples are of varied sizes, whereby a greater or less quantity of water is permitted to pass through the different nipples in a specified period of time. Thus, for illustration, where the given quantity of water is desired to pass rapidly through a nipple the nipple on the cock 40 is employed, while if it is desired that the same quantity of water pass very slowly the nipple 50, having the smallest opening, is employed.

51 designates a water-gage to indicate the height of the water in the water-tank.

The operation of the apparatus is as follows: The boiler is filled with water and likewise the water-tank 5. Heat being applied to the boiler the water therein is heated to boiling temperature. The eggs to be boiled are placed in the basket 16. At this time the cock 31 is open and its arm 34 is in vertical position. Then, according to the length of time desired to boil the eggs in the basket, one of the valve-plugs 45 or the plug of the cock 40 is turned for the discharge of water therethrough when the water is turned on from the tank, it being understood that up to this time the cock 29 is closed. The egg-basket is then lowered into the boiler, which action places the pulley 11 and its attached parts, including the water bucket, in the position shown in Figs. I and II, and simultaneously with the lowering of the basket into the boiling water the cock 29 is opened and the water from the tank is permitted to flow to the valve or cock that has previously been opened, and as the bucket 19 hangs immediately beneath the multiple valve and cock 40 the stream of water emerging from either of them through its attached nipple empties directly into said bucket, the bucket, by virtue of the diagonal slot 17ª in its supporting-hook, always hanging with its bail out of line of the stream of water from either discharge. Now when the egg-basket is lowered into the water in the boiler it has a greater weight at its end of the chain 12 than the empty water-bucket 19 has at the opposite end of the chain, and so long as this remains the case the egg-basket will remain lowered. The water falling into the bucket 19, however, gradually increases the weight at the bucket end of the chain 12, until at the expiration of a predetermined period of time, controlled by the size of the nipple 50 in use, the bucket with its contents becomes heavier than the egg-basket and its contents, and the result naturally follows that the bucket descends and the egg-basket is raised out of the water in the boiler. When this movement occurs the pulley 11 necessarily rotates, and as soon as it begins to move the weight 23 on the arm 22 is thrown from vertical position and its weight is added to accelerate the movement of the pulley and its attached parts, in order to quickly withdraw the egg-basket from the boiling water when the period of time desired to cook them has expired. As the pulley rotates, the arm 20 moves with it, and the projection 21 on said arm comes in contact with the arm 34, attached to the key 33 of the cock 31 and carries the arm 34 until these parts reach the position indicated by dotted lines, Fig. IV, by which means the flow of water through the cock 31 is cut off, and consequently the discharge of water ceases.

As before explained, the nipples 50 are provided with openings of varied sizes. The size of these openings is made such that the same quantity of water, which is the quantity necessary to overcome the superior weight of the egg-basket, will pass through the nipples in different spaces of time. Thus, for illustration, the nipple on the cock 40 may allow the necessary amount of water to be discharged in one minute, while in the multiple valve, from the nipple having the largest opening toth at having the smallest, the same quantity of water may discharge in two, three, four, and six minutes.

I claim as my invention—

1. In an apparatus for boiling eggs, the combination of a boiler, an egg receptacle, a water receptacle, a connection between said receptacles, a source of water supply, a pipe leading from said source of supply, a cock or valve in said pipe, and means carried by said receptacles and connection arranged to operate said cock or valve, substantially as described.

2. In an apparatus for boiling eggs, the combination of a boiler, an egg receptacle, a water receptacle, a flexible connection between said receptacles, a source of water supply, a pipe leading from said source of supply, a cock or valve in said pipe, and means carried by said receptacles and their connection arranged to operate said cock or valve, substantially as described.

3. In an apparatus for boiling eggs, the combination of a boiler, an egg receptacle, a water receptacle, a flexible connection between said receptacles, a pulley on which said connection travels, a source of water supply, a pipe leading from said source of supply, a cock or valve in said pipe, and means carried by said pulley arranged to operate said cock or valve, substantially as described.

4. In an apparatus for boiling eggs, the combination of a boiler, an egg receptacle, a water receptacle, a flexible connection between said receptacles, a pulley on which said connection travels, a source of water supply, a pipe leading from said source of supply, a cock or valve in said pipe, and an arm on said pulley arranged to operate said cock or valve, substantially as described.

5. In an apparatus for boiling eggs, the combination of a boiler, an egg receptacle, a water receptacle, a flexible connection between said receptacles, a pulley on which said connection travels, a weight at one side of said pulley, a source of water supply, a pipe leading from said source of supply, a cock valve in said pipe, and an arm on said pulley arranged to operate said cock or valve, substantially as described.

6. In an apparatus for boiling eggs, the combination of a boiler, an egg receptacle, a water receptacle, a flexible connection between said receptacles, a pulley on which said connection travels, a source of water supply, a pipe leading from said source of supply, a cock or valve in said pipe, an arm secured to said cock or valve, and an arm on said pulley arranged to operate said cock or valve by contact with the arm thereon, substantially as described.

7. In an apparatus for boiling eggs, the combination of a boiler, an egg receptacle, a water receptacle, a connection between said receptacles, a source of water supply, a pipe leading from said source of supply, means operated by said receptacles and connection to control the passage of water through said pipe, and one or more cocks or valves provided with nipples, through which water is permitted to discharge into said water receptacle, substantially as described.

8. In an apparatus for boiling eggs, the combination of a boiler, an egg receptacle, a water receptacle, a connection between said receptacles, a source of water supply, a pipe leading from said source of supply, means operated by said receptacles and connection to control the passage of water through said pipe, a cock or valve through which water may discharge into said water receptacle, and a nipple applied to said cock or valve, substantially as described.

9. In an apparatus for boiling eggs, the combination of a boiler, an egg receptacle, a water receptacle, a connection between said receptacles, a source of water supply, a pipe leading from said source of supply, means operated by said receptacles and connection arranged to control the passage of water through said pipe, and a multiple valve provided with plugs which are supplied with nipples, substantially as described.

10. In an apparatus for boiling eggs, the combination of a boiler, an egg receptacle, a water receptacle, a connection between said receptacles, a source of water supply, a pipe leading from said source of supply, and means operated by said receptacles and connection to control the passage of water through said pipe, an arm provided with a passageway secured to said pipe, a multiple valve mounted on said arm, said multiple valve consisting of a disk containing ducts or channels and plugs arranged to control the passage of water through said ducts or channels, and nipples through which the water discharges from said plugs to said water receptacle, substantially as described.

11. In an apparatus for boiling eggs, the combination of a boiler, an egg receptacle, a water receptacle, a connection between said receptacles, a pulley on which said connection travels, a weight on said pulley, an arm on said pulley, a source of water supply, a pipe leading from said source of supply, a cock or valve in said pipe arranged to be operated by the arm on said pulley, a cock or valve through which the water is discharged from said pipe, and one or more nipples applied to said cock or valve, substantially as described.

12. In an apparatus for boiling eggs, the combination of a boiler, an egg receptacle, a water receptacle, a connection between said receptacles, a source of water supply, a strainer through which the water of said source of supply passes, a pipe leading from said source of supply, a cock or valve in said pipe, a means carried by said receptacles arranged to operate said cock or valve, substantially as described.

13. In an apparatus for boiling eggs, the combination of a boiler, an egg receptacle, a water receptacle, a connection between said receptacles, a water tank, a strainer located in said water tank, a pipe leading from said tank, a cock or valve in said pipe, and means carried by said receptacle and connection arranged to operate said cock and valve, substantially as described.

14. In an apparatus for boiling eggs, the combination of a boiler, an egg receptacle, a water receptacle, a connection between said receptacles, a water tank, partitions in said tank, a strainer located in said tank, partitions in said strainer, a pipe leading from said tank, a cock or valve in said pipe, a means carried by said receptacles and connection arranged to operate said cock or valve, substantially as described.

15. In an apparatus for boiling eggs, the combination of a boiler, an egg receptacle, a water receptacle, a connection between said receptacles, a pulley on which said connection travels, an arm on said pulley, a water tank, a strainer in said tank, a pipe leading from said tank, a cock or valve in said pipe arranged to be operated by the arm on said pulley, a cock or valve through which the water is discharged from said pipe, and a nipple applied to said last mentioned cock or valve, substantially as described.

JACOB R. SPRAGUE.

In presence of—
E. S. KNIGHT,
N. FINLEY.